United States Patent
Louaisil et al.

(10) Patent No.: US 10,295,061 B2
(45) Date of Patent: May 21, 2019

(54) SEAL COMPRISING A CONTINUOUSLY VARIABLE SHAPE AND LATERAL RETAINING STRIPS

(71) Applicant: Carl Freudenberg KG, Weinheim (DE)

(72) Inventors: Kevin Louaisil, Limoges (FR); Arnaud Correia, Limoges (FR); Daniel Raillard, Chamboret (FR); Olivier Jeanne, Saint-Junien (FR)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 15/525,288

(22) PCT Filed: Nov. 24, 2015

(86) PCT No.: PCT/IB2015/059102
§ 371 (c)(1),
(2) Date: May 8, 2017

(87) PCT Pub. No.: WO2016/087995
PCT Pub. Date: Jun. 9, 2016

(65) Prior Publication Data
US 2017/0321805 A1    Nov. 9, 2017

(30) Foreign Application Priority Data
Dec. 2, 2014    (FR) ...................................... 14 61787

(51) Int. Cl.
*F16J 15/06*    (2006.01)
*F16J 15/10*    (2006.01)

(52) U.S. Cl.
CPC ........... *F16J 15/061* (2013.01); *F16J 15/104* (2013.01)

(58) Field of Classification Search
CPC .......... F16J 15/021; F16J 15/022; F16J 15/06; F16J 15/10; F16J 15/061; F16J 15/104
See application file for complete search history.

(56) References Cited

U.S. PATENT DOCUMENTS 5,687,975 A    11/1997    Inciong
8,439,366 B2 *    5/2013    Raillard ................. F16J 15/064
                                                                277/598
(Continued)

FOREIGN PATENT DOCUMENTS

CN    101675278 A    3/2010
CN    101892923 A    11/2010
(Continued)

OTHER PUBLICATIONS

Chinese Office Action dated Sep. 17, 2018 with English translation (corresponding to CN201580065576.9).

*Primary Examiner* — Eugene G Byrd
(74) *Attorney, Agent, or Firm* — Daniel J. Sepanik, Esq.; Harness, Dickey & Pierce, P.L.C.

(57) ABSTRACT

An elastomer seal or gasket is to be inserted in a groove produced vertically on a support plane of a part, and tightened or clamped on an additional flat surface, with the seal presenting at least a portion of its cross-section (18, 20) including longitudinally a continuously variable shape, including fine side trips (42) spaced on at least one side and which are arranged vertically.

11 Claims, 2 Drawing Sheets

(56) References Cited

U.S. PATENT DOCUMENTS

| | | | |
|---|---|---|---|
| 2004/0000763 A1* | 1/2004 | Gernand | F16J 15/061 277/630 |
| 2009/0085306 A1* | 4/2009 | Hayashi | F16J 15/061 277/644 |
| 2010/0044970 A1 | 2/2010 | Suzuki et al. | |
| 2011/0169228 A1 | 7/2011 | Karram et al. | |
| 2011/0193298 A1* | 8/2011 | Yoshitsune | F16J 15/061 277/648 |
| 2011/0278839 A1* | 11/2011 | Danielewicz | F16J 15/061 285/335 |
| 2014/0197606 A1* | 7/2014 | Jeanne | F16J 15/024 277/644 |

FOREIGN PATENT DOCUMENTS

| | | | | |
|---|---|---|---|---|
| CN | 102128265 A | | 7/2011 | |
| DE | 2605512 A1 | * | 8/1977 | B63B 19/26 |
| DE | 2605512 C2 | | 6/1986 | |
| JP | 10009395 A | * | 1/1998 | F16J 15/061 |
| JP | 2006-029364 A | | 2/2006 | |
| JP | 2009250272 A | * | 10/2009 | F16J 15/061 |
| WO | 2012-095601 A1 | | 7/2012 | |
| WO | 2014-185168 A1 | | 11/2014 | |

* cited by examiner

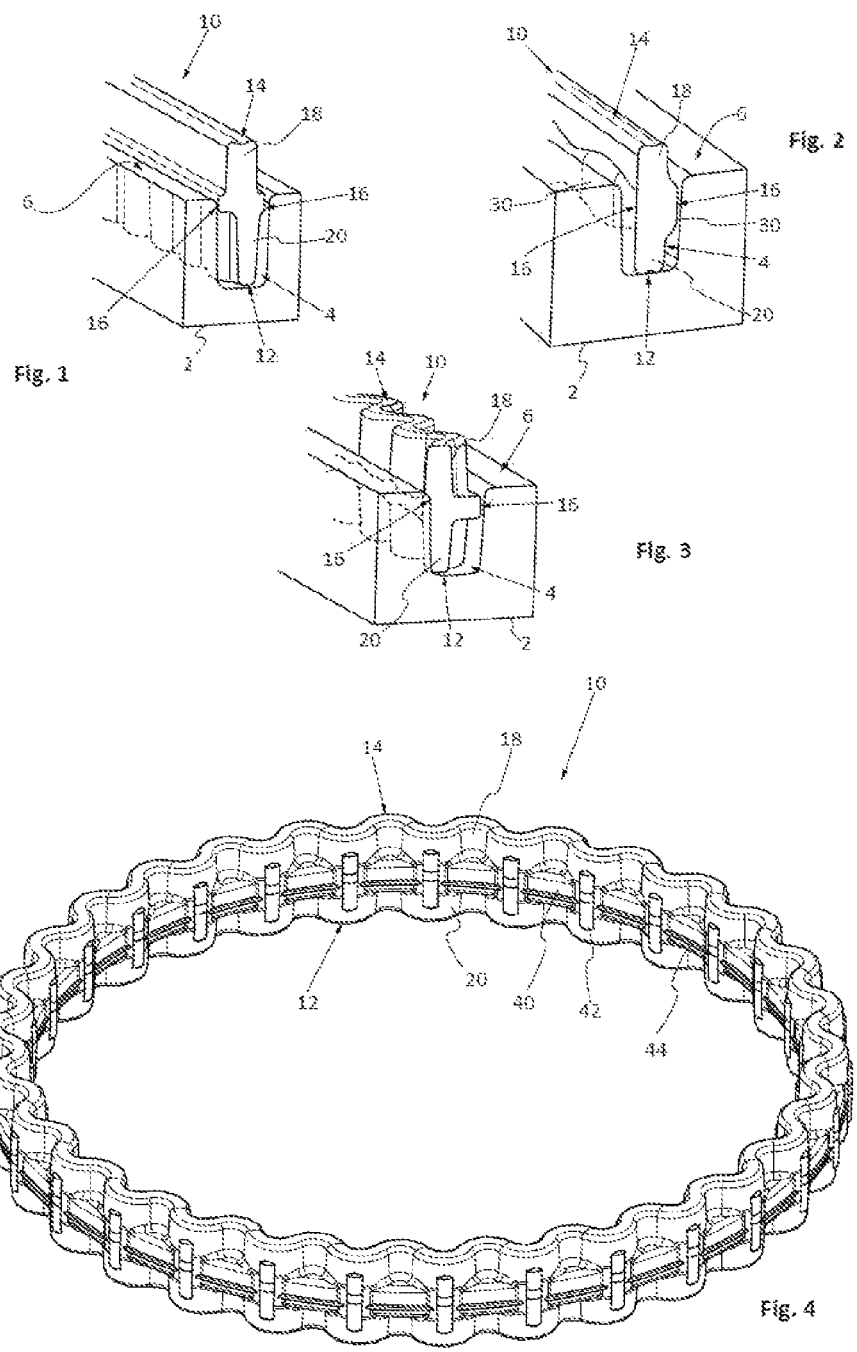

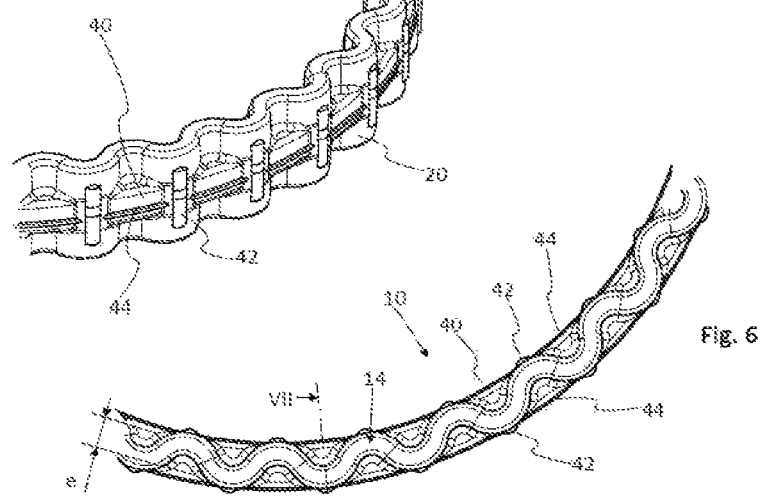
Fig. 5
Fig. 6
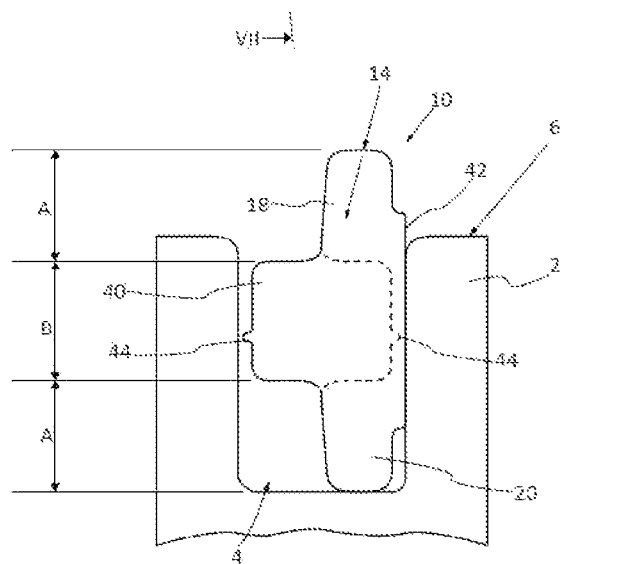
Fig. 7

SEAL COMPRISING A CONTINUOUSLY VARIABLE SHAPE AND LATERAL RETAINING STRIPS

CROSS-REFERENCE TO RELATED APPLICATIONS

This application is a National Stage of International Application No. PCT/IB2015/059102, filed Nov. 24, 2015, which claims priority to French Application No. 1461787, filed Dec. 2, 2014. The entire disclosures of each of the above applications are incorporated herein by reference.

FIELD

The present disclosure concerns an elastomer seal or gasket to be placed in a groove between two parts to be assembled, as well as a unit comprising a part containing a groove receiving such seal or gasket.

BACKGROUND AND SUMMARY

A known type of seal or gasket, introduced among others by document WO-A1-2012095601, comprises a longitudinal elastomer section inserted in a groove provided in a support plane of a part, that is compressed at the same time at the bottom of this groove, and on an additional flat surface of a second part clamped on this first support plane, so as to ensure an imperviousness between these two parts.

This type of seal or gasket is used among others to ensure the imperviousness in a combustion engine, in particular for clamping a cylinder head cover on this cylinder head. It can be achieved with various elastomer types that can be compressed, such as rubber or synthetic polymers.

The cross-section of the gasket or seal comprises a certain height that ensures at any point a sufficient compression of this gasket, guaranteeing imperviousness continuously on the corresponding flat surface.

The gasket can include according to the location specific shapes added to the section, to produce for instance the circumventing of securing screws, the imperviousness in a non-flat area comprising a shaft bearing or the assembly of three parts among each other.

In particular, the section comprises at least one part of its cross-section that presents lengthwise a continuously variable geometry, in order to reduce the quantity of material used, and to decrease cost. This variable geometry may present a wave.

The section can also include on each side of the cross-section, in a central part, a low-height side boss and of constant section that extends longitudinally, taking support on the sides of the groove so as to produce a lateral blocking of the gasket or joint to avoid its tilting when it is compressed between the two parts.

However, tests have indicated that for mass production comprising dispersions of dimensions, this type of seal or gasket might cause problems of lateral tipping of its section, or of pinching between the two support faces when they are clamped one against the other.

Among other, the purpose of this invention is to prevent these drawbacks of the prior state of the art.

For that purpose, it proposes an elastomer seal or gasket to be inserted in a groove vertically on a support plane of a part, and clamped or tightened against an additional flat surface, with this seal or gasket showing at least a portion of its cross-section comprising longitudinally a continuously variable shape, characterized in that it includes spaced on at least one side, fine side strips arranged vertically.

An advantage of this seal or gasket is that the side strips constitute by virtue of their height lateral supports on the sides of the groove that prevent this seal or gasket from tipping during its mounting and clamping or tightening.

This way, simply and economically through additional shapes made to the molding and by adding a small amount of material, a stability of the seal is achieved which in spite of the dispersions of the dimensions of the section of the groove or seal, guarantees in all cases a proper assembly and a good imperviousness.

The seal or gasket according to the disclosure may also include one or several of the following features which can be combined with each other.

In particular, the side strips may include a curved profile turned to the outside. This curved profile facilitates a crushing of the material.

Beneficially, the side strips reach in height below the top surface of the seal or gasket. This way one avoids having at the seal plane level during vertical compression of the impervious seal, support material on the side of the groove that might be pinched during clamping or tightening of the parts to be assembled.

In particular, the side strips may extend over about two thirds of the height of this seal or gasket, centered over this height.

According to a method of embodiment of this disclosure, the seal or gasket comprising top and bottom parts of its cross-section which are continuously variable, the side strips cover about half of these top and bottom parts.

Beneficially, the seal or gasket comprises side strips which on either side of this seal, are longitudinally offset alternatively. As such, a regularly distributed lateral stability over the length of the seal or gasket is ensured.

In particular, the continuously variable shape may constitute a sinusoid.

In this case, beneficially, the seal or gasket comprises a side strip on each side, at each top of the sinusoid.

According to a method of embodiment of the disclosure, the seal or gasket comprising a central part of its cross-section showing longitudinally a constant section, this central part comprises on each side a longitudinal rib that extends towards the outside.

Beneficially, the side strips exceed the longitudinal rib transversally.

The purpose of the disclosure is also a set of two parts assembled to each other by an impervious flat surface with each of these parts comprising a groove containing a seal or gasket that comprises any of the preceding features.

In particular, one of the parts of this unit may constitute a cylinder head of a combustion engine, with the other part forming a cover for said cylinder head.

DRAWINGS

Other features and benefits will arise out of the description that will follow for the disclosure; such description is provided as an example only, with respect to the attached drawings where:

FIGS. 1, 2 and 3 show a cross-section of three different seals or gaskets accomplished according to the document of the prior state of the art;

FIGS. 4, 5 and 6 show respectively an overall view, a detailed view and an overhead view of a seal or gasket according to the disclosure; and FIG. 7 shows a cross-section according to the VII-VII sectional plane of this seal or gasket inserted in the groove of a part to be assembled.

FIG. 1 shows a part to assemble 2 comprising a support plane 6 provided to be supported on an additional flat surface of a second part, having a longitudinal groove 4 with a considerable rectangular section that is greater in height than in width that receives seal or gasket 10 to be compressed vertically by this additional surface.

DETAILED DESCRIPTION

By convention with the various figures, the vertical direction corresponds to the depth of groove 4.

Seal or gasket 10 comprises in its cross-section a flat bottom surface 12 that rests at the bottom of groove 4 and a top surface 14 showing transversally a small central depression surrounded by two lateral bosses that permits to concentrate the supporting force on a reduced surface in order to increase the surface pressure and to improve imperviousness.

The support of these two bottom 12 and top 14 surfaces ensures the imperviousness between the two parts, at the seal plane level.

Seal or gasket 10 shows on each side substantially at the middle of its height, a continuous lateral support 16 formed by a longitudinal low boss; these supports come in contact with the sides of groove 4 when the seal is compressed in height, in order to block it laterally and prevent its tilting.

The top part of seal 18 above the lateral supports 16 comprises longitudinally a constant straight section; the bottom part 20 under these supports comprises in this direction a sinusoidal wavy section.

The considerably reduced width of top part 18 as well as the undulations of bottom part 20 with respect to the total width of seal or gasket 10 at the level of lateral supports 16, produce a reduction of the material quantity.

Then, there is a risk of inclination of seal or gasket 10; the right top part 18 as well as the undulated bottom part 20 may incline laterally in groove 4, in particular when the tolerances of these components provide greater play.

FIG. 2 shows a seal or gasket 10 comprising a central part having longitudinally successive bosses 30 of considerable height which alternate from one side to the other of this seal. These successive bosses 30 constitute the continuously variable shape.

The top 18 and bottom 20 parts of seal or gasket 10 show longitudinally a constant straight section, comprising a width that is smaller with respect to the total width of this seal or gasket.

FIG. 3 shows a seal or gasket 10 comprising on each side in the middle of its height a continuous side support 16, and a top part 18 as well as a bottom part 20 that comprise longitudinally a sinusoidal undulated section with a reduced width.

These seals or gaskets 10 shown in FIG. 2 and FIG. 3, also comprise a lateral tilting risk in groove 4 during mounting or clamping or tightening.

There is also a risk of pinching seal or gasket 10 between the two parts to be assembled during their clamping or tightening. During a vertical compression of seal or gasket 10, the material produces a lateral expansion. At the seal plane height, the supporting material on the side of groove 4, such as the top of the undulations of the undulated section, that may form a swelling that extends beyond the support plane 6, shows a risk of pinching between the two assembled parts.

FIG. 4 shows a seal or gasket 10 that forms a closed crown to be inserted in a groove that comprises an equivalent length and comprises any contour with this flexible seal adapting to various contour shapes.

FIGS. 5, 6 and 7 show seal or gasket 10 embodied according to a preferred method of the disclosure, comprising in the cross-section two top 18 and bottom 20 parts that are symmetrical with respect to a horizontal median plane, each comprising a same height A that forms longitudinally a sinusoidal undulation.

Central part 40 of seal or gasket 10 comprising a height B that is substantially equal to height A of the top 18 and bottom 20 parts, comprises a substantially square section that is constant longitudinally. This central part 40 that comprises a constant section, enables the stabilization of the general dimensions of the seal or gasket.

Both sides of this central part 40 receive a little below the horizontal median plane, a continuous rib 40 longitudinally, that forms a point directed to the outside, of which the extremity is adjusted on the top of the sinusoidal undulation of the top 18 and bottom 20 parts.

On each side of seal or gasket 10, each top of the sinusoidal undulation receives a fine lateral strip arranged vertically 42 that covers central part 40 and extends for about half of each top 18 and bottom 20 part. This way, one obtains lateral strips 42 that comprise a length that covers about the two-thirds of the seal or gasket 10 height.

One will notice on FIG. 7 that lateral strips 42 of seal or gasket 10 that is not compressed, extend beyond support plane 6.

Vertical strips 42 show a curved profile that then projects longitudinal ribs 44 laterally.

In this way, one obtains periodically at each top of the undulation, a vertical strip 42 that is arranged alternatively on either side of seal or gasket 10, with an offset longitudinally.

These vertical strips 42 achieve with a very small quantity of material, a flexible lateral blocking of seal or gasket 10 over a large portion of the groove 4 height which can crumble easily thanks to their reduced width, during a vertical compression of this seal that leads to a transversal extension. This way, the vertical compression of seal or gasket 10 which operates substantially in the same fashion, is not affected.

In addition, during the clamping or tightening of these two parts to be assembled, the vertical compression of seal or gasket 10 causes the top part 18 of this seal to descend below the support plane 6 level. The vertical strip 42 in support on the side of groove 4 is then entirely lowered into this groove before the top part descends fully. The undulations of top part 18 removed from the sides of groove 4 by the vertical strips 42, are removed from these sides at the seal plane level and do not run the risk of being pinched between the two parts to be assembled. Vertical strips 42 also permit to rigidify the seal in height and to limit the risks of tilting and pinching between the two parts to be assembled.

In spite of the dispersions of the dimensions of seal or gasket 10 and the groove 4 related to mass production, this seal can no longer tilt down into this groove, nor be pinched during the tightening or clamping of the support faces of the two parts. This provides an operating assurance of this seal or gasket 10.

In general, vertical strips 42 can comprise a different profile that may be triangular for instance, as well as having different spacing by arranging them for instance on the sinusoidal undulation according to another frequency. They can also be arranged for other continuously variable geometrical shapes, without comprising a sinusoidal undulation.

Vertical strips 42 can be applied in particular to different types of seals or gaskets shown by the document of the prior state of the art, such as the seals or gaskets shown in FIGS. 1, 2 and 3.

The present disclosure applies to ensure the imperviousness of any assembly between two parts. It applies in particular to ensure the imperviousness of a cylinder head cover on the cylinder head, comprising serious pressure, and temperature variation and aggression constraints of various chemical agents.

The invention claimed is:

1. An elastomer seal to be inserted in a groove (4) produced vertically on a support plane (6) of a part (2) and tightened against an additional flat surface, with the seal presenting at least one part of its cross-section (18, 20) comprising longitudinally a continuous variable shape including undulations with laterally interior and exterior peaks, wherein the seal includes vertically arranged side strips (42) which are disposed on each of the laterally interior and exterior peaks of the undulations.

2. The seal according to claim 1, wherein the side strips (42) comprise a curved profile turned towards the outside.

3. The seal according to claim 1, wherein the side strips (42) run vertically to below a top surface (14) of the seal.

4. The seal according to claim 3, wherein the side strips (42) extend over about two thirds of a height of the seal, centered on the height.

5. The seal according to claim 1, comprising top (18) and bottom (20) parts of its cross-section which are continuously variable, wherein the side strips (42) cover about half of these top (18) and bottom (20) parts.

6. The seal according to claim 1, wherein the seal includes side strips (42) on both sides of the seal, which are lengthwise offset alternatively.

7. The seal according to claim 1, wherein the continuously variable shape represents a sinusoid.

8. The seal according to claim 1, further comprising a central part (40) having longitudinally a constant section, wherein this central part (40) includes on each side a longitudinal rib (44) that projects to the outside.

9. The seal according to claim 8, wherein the side strips (42) exceed the longitudinal rib (44) transversally.

10. A unit of two parts assembled to each other by a flat impervious surface, wherein one of these parts (2) includes a groove (4) containing the seal (10), according to claim 1.

11. The unit of two parts assembled to each other according to claim 10, wherein one of the parts represents a cylinder head of a combustion engine, with the other part forming a cover for the cylinder head.

* * * * *